US009525781B2

(12) United States Patent
Li et al.

(10) Patent No.: US 9,525,781 B2
(45) Date of Patent: Dec. 20, 2016

(54) METHOD, APPARATUS AND SYSTEM FOR AGGREGATING CHARGING INFORMATION

(71) Applicant: Alcatel Lucent, Boulogne-Billancourt (FR)

(72) Inventors: Xiangyang Li, Shanghai (CN); Yigang Cai, Naperville, IL (US)

(73) Assignee: Alcatel Lucent, Boulonge-Billancourt (FR)

( * ) Notice: Subject to any disclaimer, the term of this patent is extended or adjusted under 35 U.S.C. 154(b) by 0 days.

(21) Appl. No.: 14/766,537

(22) PCT Filed: Feb. 17, 2014

(86) PCT No.: PCT/EP2014/052983
§ 371 (c)(1),
(2) Date: Aug. 7, 2015

(87) PCT Pub. No.: WO2014/125102
PCT Pub. Date: Aug. 21, 2014

(65) Prior Publication Data
US 2015/0373205 A1    Dec. 24, 2015

(30) Foreign Application Priority Data

Feb. 17, 2013    (CN) .......................... 2013 1 0052044

(51) Int. Cl.
| | | |
|---|---|---|
| H04W 4/24 | (2009.01) | |
| H04M 15/00 | (2006.01) | |
| H04W 4/00 | (2009.01) | |
| H04L 12/14 | (2006.01) | |
| H04L 12/24 | (2006.01) | |

(52) U.S. Cl.
CPC .......... *H04M 15/66* (2013.01); *H04L 12/1407* (2013.01); *H04L 41/0893* (2013.01); *H04M 15/41* (2013.01); *H04M 15/44* (2013.01); *H04M 15/67* (2013.01); *H04M 15/8207* (2013.01); *H04W 4/005* (2013.01); *H04W 4/24* (2013.01)

(58) Field of Classification Search
CPC .. H04L 12/18; H04L 12/0893; H04L 12/1435; H04L 12/1439; H04M 15/43; H04M 15/66; H04M 15/67; H04W 4/005
(Continued)

(56) References Cited

U.S. PATENT DOCUMENTS

2005/0220064 A1\* 10/2005 Hundscheidt .......... H04L 12/18
370/342
2010/0197267 A1    8/2010 Raleigh
(Continued)

FOREIGN PATENT DOCUMENTS

| | | |
|---|---|---|
| EP | 2341660 A1 | 7/2011 |
| JP | 2012533242 A | 12/2012 |

OTHER PUBLICATIONS

International Search Report PCT/ISA/210 for International Application No. PCT/EP2014/052983 dated Mar. 27, 2014.

*Primary Examiner* — Phuoc H Doan
(74) *Attorney, Agent, or Firm* — Harness, Dickey & Pierce, P.L.C.

(57) ABSTRACT

The network element collects, within a time window, charging information of a plurality of user equipments belonging to a same group, aggregates the charging information to obtain a charging aggregation result, and sends the charging aggregation result to a corresponding device in said system. The charging system receives a plurality of pieces of aggregated charging information and time windows sent by a network element in the system, wherein each piece of charging information respectively corresponds to one of the time windows, and aggregates the plurality of pieces of aggregated charging information based on the time windows and the group(s) and/or sub-group(s) to which the user equipments belong, to generate charging data record(s), wherein the time windows and the user equipments correspond to the plurality of pieces of aggregated charging information.

17 Claims, 5 Drawing Sheets

(58) Field of Classification Search
USPC .......... 379/114.03, 114.01, 114.06; 370/342; 455/406
See application file for complete search history.

(56) References Cited

U.S. PATENT DOCUMENTS

| | | | |
|---|---|---|---|
| 2012/0039450 A1* | 2/2012 | Labuda | H04M 15/43 |
| | | | 379/114.03 |
| 2013/0003609 A1 | 1/2013 | Ballot et al. | |
| 2013/0065553 A1 | 3/2013 | Raleigh | |
| 2014/0024340 A1 | 1/2014 | Raleigh | |

* cited by examiner

METHOD, APPARATUS AND SYSTEM FOR AGGREGATING CHARGING INFORMATION

FIELD OF THE INVENTION

The present invention relates to the field of communication technology, and more specifically, to a method, apparatus and system for aggregating charging information.

BACKGROUND OF THE INVENTION

Expedite increase of network users brings extreme burden to the prior art communication networks. In particular, in an MTC (Machine Type Communication)-enabled system, there is a considerable amount of charging processing information from network subscribers. For example, a single customer may have more than 1000 subscriptions. Transmission and processing of such charging processing information causes great burden to a communication network.

SUMMARY OF THE INVENTION

An objective of the present invention comprises providing a method, apparatus, and system for aggregating charging information.

According to one aspect of the present invention, there is provided a method for aggregating charging information in a network element of an MTC-enabled system, wherein the method comprises the following steps:

a. collecting, within a time window, charging information of a plurality of user equipments belonging to a same group;

b. aggregating said charging information to obtain a charging aggregation result;

c. sending said charging aggregation result to a corresponding device in said system.

According to another aspect of the present invention, there is further provided a method for generating charging data record(s) in a charging system of an MTC-enabled system, wherein the method comprises the following steps:

A. receiving a plurality of pieces of aggregated charging information and time windows sent by a network element in said system, wherein each piece of charging information respectively corresponds to one of the time windows;

B. aggregating the plurality of pieces of aggregated charging information based on the time windows and the group(s) and/or sub-group(s) to which the user equipments belong, to generate charging data record(s), wherein the time windows and the user equipments correspond to the plurality of pieces of aggregated charging information.

According to a further aspect of the present invention, there is further provided an apparatus for aggregating charging information in a network element of an MTC-enabled system, wherein the apparatus comprises:

a collecting module configured to collect, within a time window, charging information of a plurality of user equipments belonging to a same group;

a first aggregating module configured to aggregate said charging information to obtain a charging aggregation result;

a sending module configured to send said charging aggregation result to a corresponding device in said system.

According to a still further aspect of the present invention, there is further provided an apparatus for generating charging data record(s) in a charging system of an MTC-enabled system, wherein the apparatus comprises:

a receiving module configured to receive a plurality of pieces of aggregated charging information and time windows sent by a network element in said system, wherein each piece of charging information respectively corresponds to one of the time windows;

a second aggregating module configured to aggregate the plurality of pieces of aggregated charging information based on the time windows and the group(s) and/or sub-group(s) to which the user equipments belong, to generate charging data record(s), wherein the time windows and the user equipments correspond to the plurality of pieces of aggregated charging information.

Compared with the prior art, the present invention has the following advantages: 1) a considerable amount of repetitive information exists between charging information of user equipments belonging to the same group, and even the data volume of valid user information in the charging information may be less than additional information generated by the MTC application, for example, header information or packaging information as generated to transmit a message, etc, while the embodiments of the present invention can aggregate the charging information of a plurality of user equipments belonging to the same group, thereby greatly reducing the communication traffic and alleviating the system burden; 2) after obtaining the aggregated charging data record(s), batch processing is enabled to the user equipments belonging to the same group or sub-group based on the charging relevant information of the user equipments included in the charging data records, thereby greatly accelerating the charging processing speed and alleviating the system burden.

BRIEF DESCRIPTION OF THE SEVERAL VIEWS OF THE DRAWINGS

Through reading the detailed description of the non-limiting embodiments with reference to the accompanying drawings, other features, objectives, and advantages of the present invention will become more apparent.

In the accompanying drawings, same or like reference numerals represent same or like components.

DETAILED DESCRIPTION OF THE INVENTION

Hereinafter, the present invention will be further described in detail with reference to the accompanying drawings.

Figure 1:
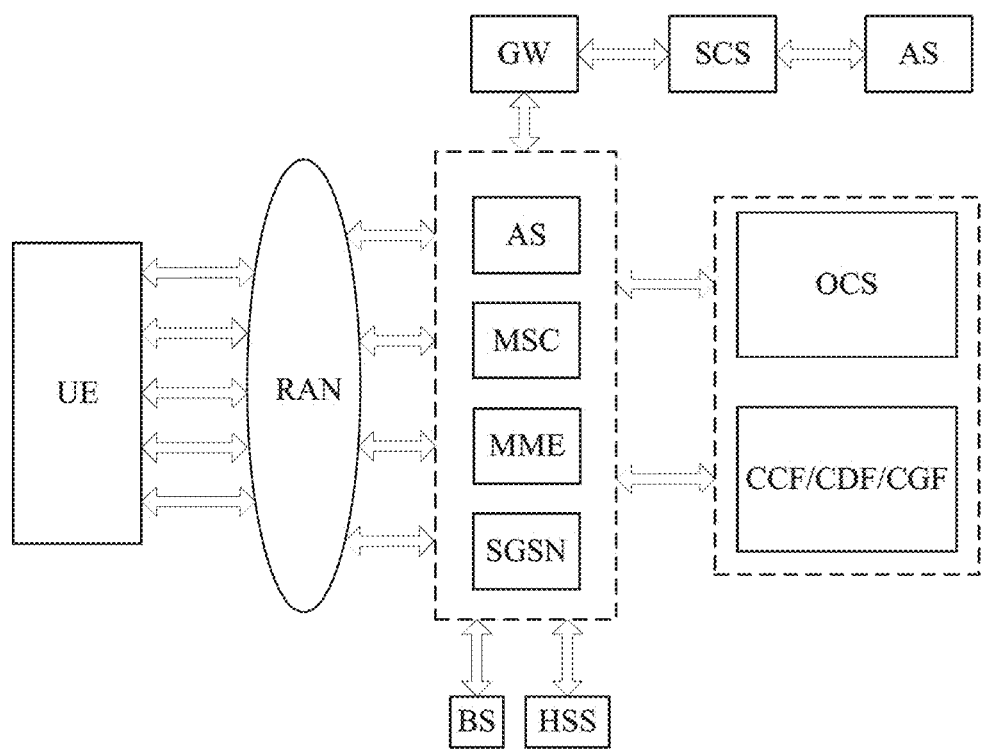
FIG. 1 shows a structural diagram of an MTC-enabled system according to one preferred embodiment of the present invention.

FIG. 1 shows a structural diagram of an MTC (Machine Type Communication)-enabled system according to one preferred embodiment of the present invention. As shown in FIG. 1, a user equipment UE accesses to the MTC-enabled system via a RAN (Radio Access Network), wherein the MTC-enabled system comprises an MSC (Mobile Switching Center), a MME (Mobile Management Entity), an SGSN (Serving GPRS Supporting Node), a GW (Gateway), a SCS (Service Capability Server), ASs (Application Servers), an HSS (Home Subscriber Server), an OCS (Online Charging System), a CCF (Charging Collection Function) or a CDF (Charging Data Function) or a CGF (Charging Gateway Function), BS (Billing System). It should be noted that the dotted-line blocks containing AS, MSC, MME and SGSN have no real meanings, which are merely for making the diagram more simpler, for example, to indicate that a device pointed by the other end of a two-way arrow pointing toward the dotted-line block can communicate with the AS, MSC, MME, and SGSN, etc.; similarly, the other dotted-line blocks in FIG. 1 also have no real meaning.

It should be noted that the above MTC-enabled system structure is merely an example, and other existing or possibly future evolved MTC architecture, if applicable to the present invention, should all be included with the protection scope of the present invention and are incorporated here by reference, for example, the MTC-enabled system may further comprise an SME (Short Message Entity) and the like that can communication with AS, MSC, MME, and SGSN.

Figure 2:
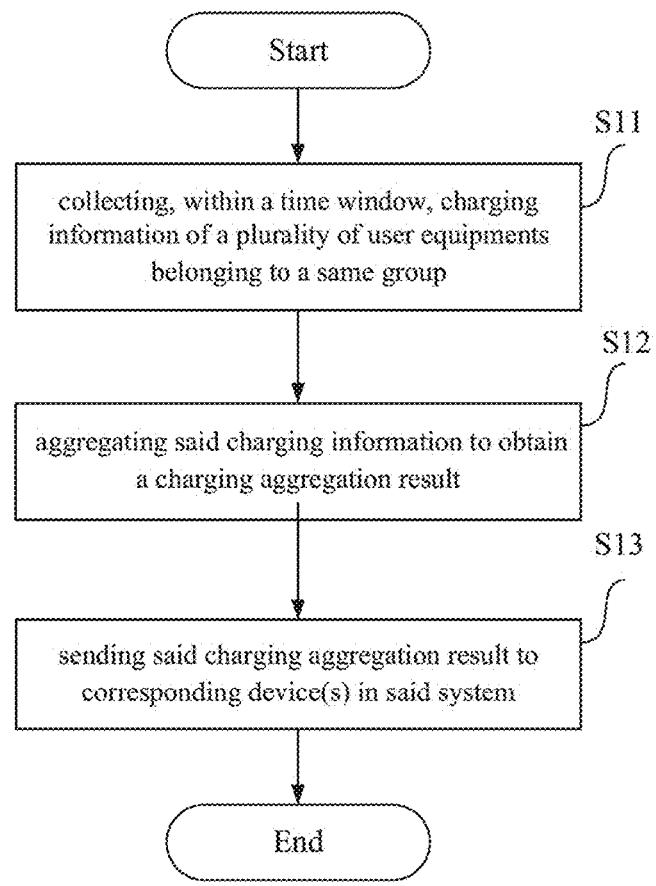
FIG. 2 shows a flowchart of a method for aggregating charging information in a network element of an MTC-enabled system according to one preferred embodiment of the present invention.

FIG. 2 shows a flowchart of a method for aggregating charging information in a network element of an MTC (Machine Type Communication)-enabled system according to one preferred embodiment of the present invention. Preferably, the network includes, but not limited to, an MSC, an MME, an SGSN, and an AS; more preferably, the AS includes, but not limited to, an SMSC (Short Message Service Center), etc.; and more preferably, the MTC-enabled system includes, but not limited to, LTE, IMS, etc.

This embodiment comprises the following steps S11, S12, and S13.

In step S11, within a time window, a network element collects charging information of a plurality of user equipments belonging to the same group.

In this embodiment, the charging information comprises a plurality of charging parameters. As an example, the charging parameters may refer to the standard TS32.299. It should be noted that during the communication process between the user equipment and the network, for example, in a call process between the user equipment and the network, the charging information might change.

Preferably, the network element may initiate collection of the charging information after receiving an Acknowledge for an MT SMS (Mobile Terminated Short Message Service) from the user equipment or after receiving an MO SMS (Mobile Originated Short Message Service) initiated by the user equipment.

In this embodiment, the network element may determine a start time and an end time of the time window based on a pre-configured policy, for example, the policy provided by a PCRF. For example, based on the policy provided by the PCRF, the network element may initiate the time window upon the first time of receiving an MT SMS Acknowledge or MO SMS including a group identification code, and receive the Acknowledge for MT SMS or MO SMS including the group identification code within the time window, wherein the start and end time of the time window may vary dynamically. It should be noted that this example is only for better illustrating the technical solution of the present invention, not for limiting the present invention. Those skilled in the art should understand that any implementation manner of determining a time range of a time window based on a pre-configured policy should be included within the scope of the present invention.

Specifically, the approaches of a network element collecting, within a time window, charging information of a plurality of user equipments belonging to the same group include, but not limited to:

1) within the time window, the network element collects charging information containing an identical group identification code to obtain charging information of a plurality of user equipments belonging to the same group.

For example, before step S11, the AS sends an MT SMS to a group of user equipments and inserts thereinto a trigger reference number corresponding to the group of user equipments; the user equipments which successfully receive the MT SMS feed back the MT SMS Acknowledge, then in step S11, when the network element receives the MT SMS Acknowledge containing the trigger reference number for the first time, the network element initiates the time window, receives all MT SMS Acknowledges containing the trigger reference number within the window, collects relevant charging parameter(s) and information including the trigger reference number, and thereby obtains charging information of the user equipments of the group corresponding to the trigger reference number.

For another example, after the network element receives an MT SMS from an SCS containing a group ID, it initiates the time window, receives within the time window MT SMS Acknowledges as fed back from the user equipments and containing the same group ID, collects relevant charging parameters and information including the group ID, and thereby obtains charging information of a group corresponding to the group ID.

It should be noted that the user equipment may provide the group ID in a plurality of manners.

For example, the user equipment may add the group identification code, for example, a group ID, of the group to which the user equipment belongs into an MT SMS Acknowledge as sent by it to the AS, wherein the user equipment may obtain the group identification code from a message as previously received thereby, for example, the previously received MT SMS.

Or, the user equipment may initiated an MO SMS (Mobile Originated Short Message Service) and adds therein the group identification code in response to an MT SMS received thereby. For example, the AS sends the MT SMS pointing towards a group of user equipments, an SCS (Service Capability Server) receives the MT SMS sent from the AS, and sends the MT SMS to the MME based on routing information from an HSS/HLR (Home Location Register) or routing information local stored, wherein the AS or SCS may insert the group identification code, for example, inserting a trigger reference number, a correlation number or a group ID, etc., into a header or body of the MT SMS; next, the MME sends the MT SMS to the group of user equipments based on the policies configured to the MME by the PCRF (Policy Control and Charging Rules Function), then the user equipments that successfully receives the MT SMS in the group may feed back the MO SMS, from which the charging parament may be obtained, based on the MT SMS, and inserts into the header of the MO SMS the group identification code obtained thereby in the MT SMS.

It should be noted that in some cases, the user equipment might not insert the group identification code in the Acknowledge or MO SMS as sent thereby.

It should be noted that a plurality of user equipments may user the same group ID in an MTC event, and the group ID is only valid in its valid time zone, for example, only valid in ToD (Time of Day) or DoW (Day of Week); and a user equipment might have a plurality of group IDs, an AS may supports certain groups, and if the group ID included in the SMS sent from the AS is not provisioned, the network element or other device in the system, for example, P-GW, etc., may reject the SMS.

2) Within the time window, for the received charging information, the network element determines the group to which a user equipment belongs based on the identifier of the user equipment, thereby collecting charging information of a plurality of user equipments belonging to the same group.

For example, the identifier information of the user equipment comprises an IMSI (International Mobile Subscriber Identity); the network element acquires the IMSI of the user equipment and obtains the group ID of the group to which the user equipment belongs through querying the local database or accessing an HSS, thereby collecting, within the window, the charging information of the user equipments belonging to the same group ID as the charging information of a plurality of user equipments in the group corresponding to the group ID.

Preferably, the network element executes the above approach 2) when the charging information does not contain the group identification code.

In some cases, the user equipment might not add the group identification code in the charging information sent thereby, for example, the user equipment initiates a new MO SMS and does not add the group identification code thereinto, etc.; this approach may provide a method of identifying the group to which a user equipment belongs in this case.

It should be noted that if the group to which a user equipment belongs cannot be determined, for example, the charging information as sent by the user equipment does not contain a group identification code, and the group to which it belongs cannot be retrieved through its identifier, then the network element may treat the user equipment as an individually charged user equipment and do not perform an aggregating operation to its charging information. Besides, even the group to which it belongs can be determined based on the identifier of the user equipment, the network element may also select to individually charge the user equipment, i.e., not aggregating the charging information sent thereby.

It should be noted that if a message such as MT SMS fails to be successfully sent to the user equipment, then the network element will attempt to send again; however, even if the re-sending succeeds, since the time length consumed for the re-sending might be longer than the time length of the time window, the feedback of the user equipment in this case might not be collected; thus, its charging information might not be aggregated.

It should be noted that the above example is only for better illustrating the technical solution of the present invention, not for limiting the present invention. Those skilled in the art should understand that any embodiment of collecting, within a time window, charging information of a plurality of user equipments belonging to the same group should be included within the scope of the present invention.

In step S12, the network element aggregates the charging information collected in step S11 to obtain a charging aggregation result.

In this embodiment, the charging aggregation result includes, but not limited to, 1) one or more pieces of aggregated charging information, wherein a piece of aggregated charging information comprises charging parameter(s) of a plurality of user equipment; 2) a CDR (charging data record) generated by aggregating the charging information, wherein the CDR includes information related to the charging in the complete communication procedure (for example, the complete call procedure) of the user equipment, as well as the start and ending time of the communication procedure, as an example, the CDR may refer to the standard TS32.298.

In this embodiment, the network element may aggregate a plurality of pieces of charging information into one or more charging aggregation results based on the policy provided by PCRF or a local policy engine; wherein, the number of aggregated charging aggregation results is less than the amount of charging information collected in step S11. Preferably, the network element may aggregate the charging information through merging the repetitive information in the charging information.

As a preferred solution of step S12, the approaches of the network element aggregating the charging information to obtain the charging aggregation result(s) include, but not limited to:

1) the network aggregates the charging information of a plurality of user equipments belonging to the same group into one charging aggregation result.

For example, the network element aggregates the charging information of a plurality of user equipments belonging to the same group to generate one charging data record; this charging data record includes the group ID of the group, to which the plurality of user equipments belong, and charging related information of respective user equipments, wherein the charging related information is capable of being used to charge, for example, it can comprises the network use traffic, the network use time and other information of respective user equipments.

For another example, the network element aggregates the charging information of a plurality of user equipments belonging to the same group into one piece of charging information etc.

Through aggregation, the information volume that needs to transmit will be greatly reduced.

2) A group may comprise a plurality of sub-groups. For example, in a group, the user equipments may be further divided into a plurality of sub-groups such as a fixed location device group, a moving device group, a roaming device group, and a geo-differentiated device group based on the types of the user equipments. The network element determines the sub-groups to which the plurality of user equipments belong respectively based on a predetermined policy and the identifiers of the plurality of user equipment, and the network element aggregates the charging information of the user equipments belonging to the same sub-group into one charging aggregation result, wherein the predetermined policy may be provided by the PCRF or the local policy engine, and the charging aggregation result comprises the identifier of its corresponding sub-group. Preferably, the aggregated charging aggregation result may further comprise the type, counter, and identifier (for example, IP address) of the user equipment and the like.

In this embodiment, the network element may identify a user equipment based on the identifier of the user equipment and determines the sub-group to which the user equipment belongs based on the predetermined policy.

In this embodiment, the approach of the network element aggregating the charging information of the user equipment belonging to the same sub-group into one charging aggregation result is identical or similar to the approach of aggregating the charging information of a plurality of user equipments belonging to the same group into one charging aggregation result in approach 1), which is thus not detailed here.

Preferably, the network element may correlate the charging aggregation results of respective sub-groups within the same group, for example, determining that the charging aggregation results of the respective sub-groups share a same group ID, etc.

Preferably, one sub-group may further include a plurality of lower-level sub-groups, for example, group A comprises a sub-group A1 and a sub-group A2, and the sub-group A1 further comprises a sub-group A11 and a sub-group A12, etc. In this case, the network element may aggregate the charging information of user equipments belonging to a sub-group that does not further comprise sub-groups into one charging aggregation result; for example, the network element aggregates the charging information of the user equipments belonging to the sub-group A11 into one charging aggregation result, aggregates the charging information of the user equipments belonging to the sub-group A12 into one charging aggregation result, and aggregates the charging information of the user equipments belonging to the sub-group A2 into one charging aggregation result.

In this embodiment, by further dividing a group into more sub-groups, a more differentiated charging information aggregation can be implemented when the AS does not support the partition of sub-groups.

It should be noted that the above example is only for better illustrating the technical solution of the present invention, instead of limiting the present invention; those skilled in the art should understand that any implementation manner of aggregating the charging information to obtain a charging aggregation result should be included within the scope of the present invention.

Next, in step S13, the network element sends the charging aggregation result to corresponding device(s) in the MTC-enabled system.

Specifically, the approaches of the network element sending the charging aggregation result to corresponding d evice(s) in the system include, but not limited to:

1) When the charging aggregation result includes the aggregated charging information, the network element sends the aggregated charging information and the time window adopted in step S11 to the charging system in the MTC-enabled system.

Preferably, the charging system may only comprise one type of charging system, or the charging system may comprise an online charging system and an offline charging system, wherein the offline charging system may comprise a CCF, a CDF/CGF. For details, please refer to the standard 3GPP TS 32.240.

For example, the network element may send the charging information and the time window to the CCF through a Rf Account Request.

For another example, the network element may send the charging information and the time window to the OCS through a Ro Credit Control Request.

In this embodiment, the RF interface is also likely called a Gz interface, and the Ro interface is also likely called a Gy interface. For the Gz interface and Gy interface, please see the standard TS32.251.

In this approach, the charging system, after receiving the aggregated charging information, will aggregate the charging information and generate CDR(s), which will be detailed in the following embodiment with reference to FIG. 3.

2) The charging aggregation result comprises the generated charging data record(s), and the network element sends the charging data record(s) to a bill generation system in the MTC-enabled system. Preferably, in this approach, the charging information used to be aggregated to generate the charging data record is called an offline charging type.

For example, the network element sends the CDR(s) to the billing system via an FTP/GTP interface; for another example, the network element sends the CDR(s) to the CGF, etc.

In this approach, the bill generation system may generate bill(s) based on the received charging data record(s).

It should be noted that the above example is only for better illustrating the technical solution of the present invention, not for limiting the present invention. Those skilled in the art should understand that any implementation manner of sending the charging aggregation result to corresponding device(s) in the system should be included within the scope of the present invention.

Since mass repetitive information exists between the charging information of user equipments belonging to the same group, even the data volume of valid user information in the charging information may be less than the additional information generated by the MTC application, for example, the header information or packaging information generated for transmitting a message, the present embodiment can aggregate the charging information of a plurality of user equipments belonging to the same group, thereby greatly reducing the communication traffic and alleviating the system burden.

As one of the preferred solutions of the present embodiment, the step S12 comprises a step S12' and the step S13 comprises a step S13'. In the present preferred solution, the charging system has a plurality of types, for example, the charging system comprises two types: online charging system and offline charging system.

In step S12', the network element aggregates the different types of charging information collected in step S11 to obtain the charging aggregation results corresponding to different charging types, respectively, i.e., obtaining the aggregated charging information or charging data records corresponding to different charging types, respectively.

In this embodiment, the network element may determine the charging type of the charging information based on the local database or through accessing HSS.

Preferably, the network element aggregates each type of charging information of the user equipments belonging to the same group into one piece of aggregated charging information or one charging data record, respectively; for example, the network element aggregates the online charging type of charging information into one piece of aggregated charging information or one charging data record corresponding to the online charging type, and aggregates the offline charging type of charging information into one piece of aggregated charging information or one charging data record.

More preferably, when a group further comprises a plurality of sub-groups, the network element determines the sub-groups, to which respective user equipments belong, based on a predetermined policy and the identifiers of respective user equipments, and aggregates the charging information, which type is the same and corresponding to the user equipments belonging to the same sub-group, into one charging aggregation result. For example, the charging type comprises an online charging type and an offline charging type; group A further comprises a sub-group A1 and a sub-group A2; then the network element aggregates charging information, which type is the online charging type and corresponding to the user equipments belonging to sub-group A1, into one charging aggregation result, aggregates the charging information, which type is the online charging type and corresponding to the user equipments belonging to sub-group A2, into one charging aggregation result, aggregates the charging information, which type is the offline charging type and corresponding to the user equipments belonging to sub-group A1, into one charging aggregation result, and aggregates the offline charging type of charging information of the user equipments belonging to sub-group A2 into one charging aggregation result.

It should be noted that the above example is only for better illustrating the technical solution of the present invention, not intended to limit the present invention. Those skilled in the art should understand that any implementation manner of aggregating different types of charging information so as to obtain charging aggregation results corresponding to different charging types respectively, i.e., obtaining aggregated charging information or charging data records corresponding to different charging types, respectively, should be included within the scope of the present invention.

Next, in step S13', the network element sends the charging aggregation results to the corresponding device(s) in the system based on the charging types to which the charging aggregation results correspond, respectively.

For example, the network element sends, within the corresponding time window, the charging data record with the online charging type to the OCS, etc.

It should be noted that for different charging types, the time lengths of the time windows as determined by the network element may vary. For example, if the type of the charging information which needs to be collected is an online charging type, the length of the time window for collecting such charging information is usually relatively short, for example, a few seconds, etc., so as to guarantee the real-time nature of the online charging.

Figure 3:
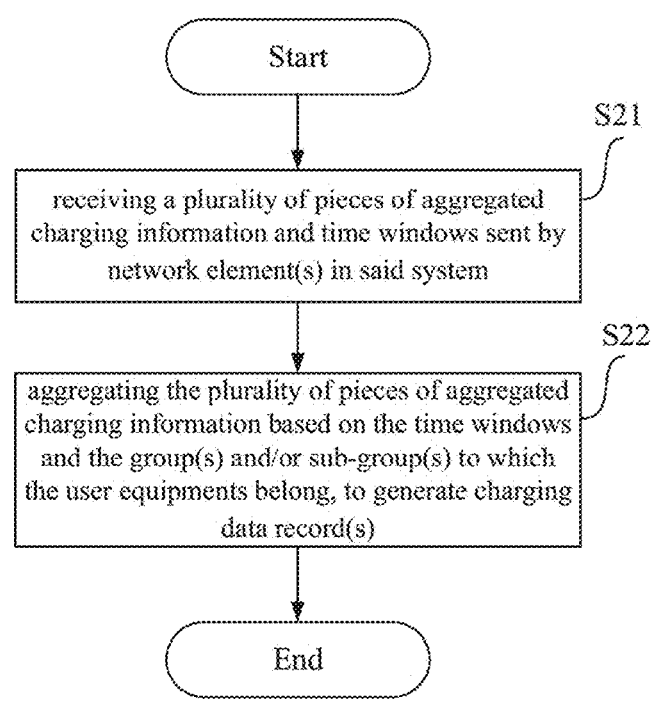
FIG. 3 shows a flowchart of a method for generating charging data record(s) in a charging system of an MTC-enabled system according to one preferred embodiment of the present invention.

FIG. 3 shows a flowchart of a method of generating charging data record(s) in a charging system according to one preferred embodiment of the present invention. The method of the present embodiment comprises step S21 and step S22.

In step S21, the charging system receive a plurality of pieces of aggregated charging information and time windows sent by network element(s) in said system, wherein each piece of charging information respectively corresponds to one of the time windows.

The network element may repetitively execute steps S11 to S13 in the embodiment with reference to FIG. 2 and send charging information aggregated using the charging information collected in different time windows.

In step S22, the charging system aggregates the plurality of pieces of aggregated charging information based on the time windows and the group(s) and/or sub-group(s) to which the user equipments belong, to generate charging data record(s), wherein the time windows and the user equipments correspond to the plurality of pieces of aggregated charging information.

In this embodiment, the charging system may directly obtain an identifier of a group and/or sub-group, to which the user equipment corresponding to the charging information belongs, from the charging information or from a request containing charging information, for example, Rf charging request or Ro credit control request, then the charging system may preferably aggregates (for example, merging repetitive information, etc.) the plurality of pieces of aggregated charging information which corresponds to identical or approximate time windows and corresponds to user equipments belonging to a same group and/or sub-group, thereby generating charging data record(s).

It should be noted that the above example is only for better illustrating the technical solution of the present invention, not for limiting the present invention. Those skilled in the art should understand that any implementation manner of aggregating the plurality of pieces of aggregated charging information based on the time windows and the group(s) and/or sub-group(s) to which the user equipments belong to generate charging data record(s), wherein the time windows and the user equipments correspond to the plurality of pieces of aggregated charging information, should be included within the scope of the present invention.

As one of the preferred solutions of this embodiment, step S22 further comprises: the charging system aggregates a plurality of pieces of aggregated charging information which corresponds to identical or approximate time windows and corresponds to user equipments belonging to a same group and/or sub-group, thereby generating a charging data record.

Preferably, the charging system may further correlate a plurality of charging data records corresponding to different sub-groups under the same group, for example, sharing the same group ID.

Preferably, there may exist a plurality of charging systems with the same charging type, for example, there exists a plurality of CCF or CDF, to handle the local traffic and for overload controlling or failover. For the sending of the aggregated charging information and the time window, the network element should determine one or more charging system, that the aggregated charging information and the time window should be sent to, of the plurality of charging systems.

After obtaining the aggregated charging data record(s), the charging system may perform batch processing to the user equipments belonging to the same group or sub-group based on the charging related information of the user equipments included in the charging data records, which greatly accelerates the charging processing speed while alleviating the system load.

It should be noted that for online charging, when the online charging system determines that some user equipments in one group or one sub-group have insufficient credits or have no qualifications, the online charging system will lock this part of user equipments, but the online charging system might allow other eligible user equipments to continue communication and send to the network element(s) licenses to those eligible user equipments. In this case, the network element only sends messages to the allowed user equipments. Moreover, in the scenario in which the network element obtains the aggregated charging information and sends it to the charging system in step S12; after receiving the licenses granted by the online charging system, the network element may also generate a charging data record based on the collected charging information, while this charging data record needs not to be provided to the charging system.

Figure 4:
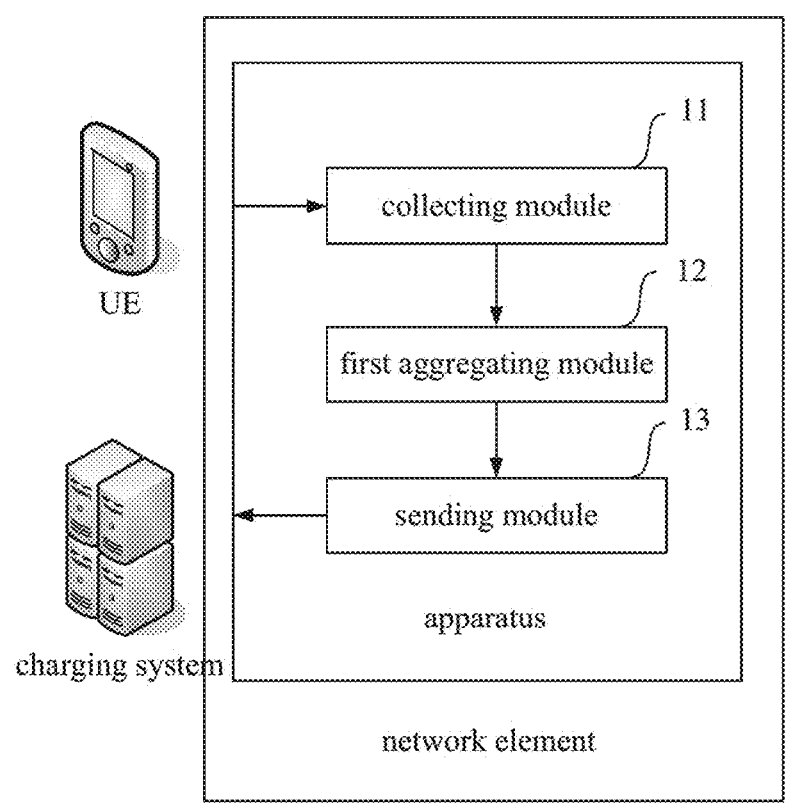
FIG. 4 shows a structural diagram of an apparatus for aggregating charging information in a network element of an MTC-enabled system according to one preferred embodiment of the present invention.

FIG. 4 shows a structural diagram of an apparatus for aggregating charging information in a network element of an MTC-enabled system according to one preferred embodiment of the present invention. The apparatus of this embodiment comprises a collecting module 11, a first aggregating module 12 and a sending module 13.

Within a time window, the collecting module 11 collects charging information of a plurality of user equipments belonging to the same group.

In this embodiment, the charging information comprises a plurality of charging parameters. As an example, the charging parameters may refer to the standard TS32.299. It should be noted that during the communication process between the user equipment and the network, for example, in a call process between the user equipment and the network, the charging information might change.

Preferably, the network element may initiate collection of the charging information after receiving an Acknowledge for an MT SMS (Mobile Terminated Short Message Service) from the user equipment or after receiving an MO SMS (Mobile Originated Short Message Service) initiated by the user equipment.

In this embodiment, the collecting module 11 may determine a start time and an end time of the time window based on a pre-configured policy, for example, the policy provided by a PCRF. For example, based on the policy provided by the PCRF, the collecting module 11 may initiate the time window upon the first time of receiving an MT SMS Acknowledge or MO SMS including a group identification code, and receive the Acknowledge for MT SMS or MO SMS including the group identification code within the time window, wherein the start and end time of the time window may vary dynamically. It should be noted that this example is only for better illustrating the technical solution of the present invention, not for limiting the present invention. Those skilled in the art should understand that any implementation manner of determining a time range of a time window based on a pre-configured policy should be included within the scope of the present invention.

Specifically, the approaches of the collecting module 11 collecting, within a time window, charging information of a plurality of user equipments belonging to the same group include, but not limited to:

1) the collecting module 11 further comprises a sub-collecting module (not shown). Within the time window, the sub-collecting module collects charging information containing an identical group identification code to obtain charging information of a plurality of user equipments belonging to the same group.

For example, before the operation of the sub-collecting module gets started, the AS sends an MT SMS to a group of user equipments and inserts thereinto a trigger reference number corresponding to the group of user equipments; the user equipments which successfully receive the MT SMS feed back the MT SMS Acknowledge, then when the network element receives the MT SMS Acknowledge containing the trigger reference number for the first time, the sub-collecting module initiates the time window, receives all MT SMS Acknowledges containing the trigger reference number within the window, collects relevant charging parameter(s) and information including the trigger reference number, and thereby obtains charging information of the user equipments of the group corresponding to the trigger reference number.

For another example, after the network element receives an MT SMS from an SCS containing a group ID, the sub-collecting module initiates the time window, receives within the time window MT SMS Acknowledges as fed back from the user equipments and containing the same group ID, collects relevant charging parameters and information including the group ID, and thereby obtains charging information of a group corresponding to the group ID.

It should be noted that the user equipment may provide the group ID in a plurality of manners.

For example, the user equipment may add the group identification code, for example, a group ID, of the group to which the user equipment belongs into an MT SMS Acknowledge as sent by it to the AS, wherein the user equipment may obtain the group identification code from a message as previously received thereby, for example, the previously received MT SMS.

Or, the user equipment may initiated an MO SMS (Mobile Originated Short Message Service) and adds therein the group identification code in response to an MT SMS received thereby. For example, the AS sends the MT SMS pointing towards a group of user equipments, an SCS (Service Capability Server) receives the MT SMS sent from the AS, and sends the MT SMS to the MME based on routing information from an HSS/HLR (Home Location Register) or routing information local stored, wherein the AS or SCS may insert the group identification code, for example, inserting a trigger reference number, a correlation number or a group ID, etc., into a header or body of the MT SMS; next, the MME sends the MT SMS to the group of user equipments based on the policies configured to the MME by the PCRF (Policy Control and Charging Rules Function), then the user equipments that successfully receives the MT SMS in the group may feed back the MO SMS, from which the charging parament may be obtained, based on the MT SMS, and inserts into the header of the MO SMS the group identification code obtained thereby in the MT SMS.

It should be noted that in some cases, the user equipment might not insert the group identification code in the Acknowledge or MO SMS as sent thereby.

It should be noted that a plurality of user equipments may user the same group ID in an MTC event, and the group ID is only valid in its valid time zone, for example, only valid in ToD (Time of Day) or DoW (Day of Week); and a user equipment might have a plurality of group IDs, an AS may supports certain groups, and if the group ID included in the SMS sent from the AS is not provisioned, the network element or other device in the system, for example, P-GW, etc., may reject the SMS.

2) Within the time window, for the received charging information, the collecting module 11 determines the group to which a user equipment belongs based on the identifier of the user equipment, thereby collecting charging information of a plurality of user equipments belonging to the same group.

For example, the identifier information of the user equipment comprises an IMSI (International Mobile Subscriber Identity); the collecting module 11 acquires the IMSI of the user equipment and obtains the group ID of the group to which the user equipment belongs through querying the local database or accessing an HSS, thereby collecting, within the window, the charging information of the user equipments belonging to the same group ID as the charging information of a plurality of user equipments in the group corresponding to the group ID.

Preferably, the collecting module 11 executes the above approach 2) when the charging information does not contain the group identification code.

In some cases, the user equipment might not add the group identification code in the charging information sent thereby, for example, the user equipment initiates a new MO SMS and does not add the group identification code thereinto, etc.; this approach may provide a method of identifying the group to which a user equipment belongs in this case.

It should be noted that if the group to which a user equipment belongs cannot be determined, for example, the charging information as sent by the user equipment does not contain a group identification code, and the group to which it belongs cannot be retrieved through its identifier, then the network element may treat the user equipment as an individually charged user equipment and do not perform an aggregating operation to its charging information. Besides, even the group to which it belongs can be determined based on the identifier of the user equipment, the network element may also select to individually charge the user equipment, i.e., not aggregating the charging information sent thereby.

It should be noted that if a message such as MT SMS fails to be successfully sent to the user equipment, then the network element will attempt to send again; however, even if the re-sending succeeds, since the time length consumed for the re-sending might be longer than the time length of the time window, the feedback of the user equipment in this case might not be collected; thus, its charging information might not be aggregated.

It should be noted that the above example is only for better illustrating the technical solution of the present invention, not for limiting the present invention. Those skilled in the art should understand that any embodiment of collecting, within a time window, charging information of a plurality of user equipments belonging to the same group should be included within the scope of the present invention.

The first aggregating module 12 aggregates the charging information collected by the collecting module 11 to obtain a charging aggregation result.

In this embodiment, the charging aggregation result includes, but not limited to, 1) one or more pieces of aggregated charging information, wherein a piece of aggregated charging information comprises charging parameter(s) of a plurality of user equipment; 2) a CDR (charging data record) generated by aggregating the charging information, wherein the CDR includes information related to the charging in the complete communication procedure (for example, the complete call procedure) of the user equipment, as well as the start and ending time of the communication procedure, as an example, the CDR may refer to the standard TS32.298.

In this embodiment, the first aggregating module 12 may aggregate a plurality of pieces of charging information into one or more charging aggregation results based on the policy provided by PCRF or a local policy engine; wherein, the number of aggregated charging aggregation results is less than the amount of charging information collected by the collecting module 11. Preferably, the first aggregating module 12 may aggregate the charging information through merging the repetitive information in the charging information.

As a preferred solution, the approaches of the first aggregating module 12 aggregating the charging information to obtain the charging aggregation result(s) include, but not limited to:

1) the first aggregating module 12 comprises a first sub-aggregating module (not shown). The first sub-aggregating module aggregates the charging information of a plurality of user equipments belonging to the same group into one charging aggregation result.

For example, the first sub-aggregating module aggregates the charging information of a plurality of user equipments belonging to the same group to generate one charging data record; this charging data record includes the group ID of the group, to which the plurality of user equipments belong, and charging related information of respective user equipments, wherein the charging related information is capable of being used to charge, for example, it can comprises the network use traffic, the network use time and other information of respective user equipments.

For another example, the first sub-aggregating module aggregates the charging information of a plurality of user equipments belonging to the same group into one piece of charging information etc.

Through aggregation, the information volume that needs to transmit will be greatly reduced.

2) A group may comprise a plurality of sub-groups. For example, in a group, the user equipments may be further divided into a plurality of sub-groups such as a fixed location device group, a moving device group, a roaming device group, and a geo-differentiated device group based on the types of the user equipments. The first aggregating module 12 comprises a sub-group determining module (not shown) and a second sub-aggregating module (not shown). The sub-group determining module determines the sub-groups to which the plurality of user equipments belong respectively based on a predetermined policy and the identifiers of the plurality of user equipment, and the second sub-aggregating module aggregates the charging information of the user equipments belonging to the same sub-group into one charging aggregation result, wherein the predetermined policy may be provided by the PCRF or the local policy engine, and the charging aggregation result comprises the identifier of its corresponding sub-group. Preferably, the aggregated charging aggregation result may further comprise the type, counter, and identifier (for example, IP address) of the user equipment and the like.

In this embodiment, the sub-group determining module may identify a user equipment based on the identifier of the user equipment and determines the sub-group to which the user equipment belongs based on the predetermined policy.

In this embodiment, the approach of the second sub-aggregating module aggregating the charging information of the user equipment belonging to the same sub-group into one charging aggregation result is identical or similar to the approach of the first sub-aggregating module aggregating the charging information of a plurality of user equipments belonging to the same group into one charging aggregation result, which is thus not detailed here.

Preferably, the second sub-aggregating module may correlate the charging aggregation results of respective sub-groups within the same group, for example, determining that the charging aggregation results of the respective sub-groups share a same group ID, etc.

Preferably, one sub-group may further include a plurality of lower-level sub-groups, for example, group A comprises a sub-group A1 and a sub-group A2, and the sub-group A1 further comprises a sub-group A11 and a sub-group A12, etc. In this case, the second sub-aggregating module may aggregate the charging information of user equipments belonging to a sub-group that does not further comprise sub-groups into one charging aggregation result; for example, the second sub-aggregating module aggregates the charging information of the user equipments belonging to the sub-group A11 into one charging aggregation result, aggregates the charging information of the user equipments belonging to the sub-group A12 into one charging aggregation result, and aggregates the charging information of the user equipments belonging to the sub-group A2 into one charging aggregation result.

In this embodiment, by further dividing a group into more sub-groups, a more differentiated charging information aggregation can be implemented when the AS does not support the partition of sub-groups.

It should be noted that the above example is only for better illustrating the technical solution of the present invention, instead of limiting the present invention; those skilled in the art should understand that any implementation manner of aggregating the charging information to obtain a charging aggregation result should be included within the scope of the present invention.

Next, the sending module 13 sends the charging aggregation result to corresponding device(s) in the MTC-enabled system.

Specifically, the approaches of the sending module 13 sending the charging aggregation result to corresponding device(s) in the system include, but not limited to:

1) The sending module 13 comprises a first sub-sending module (not shown). When the charging aggregation result includes the aggregated charging information, the first sub-sending module sends the aggregated charging information and the time window adopted by the collecting module 11 to the charging system in the MTC-enabled system.

Preferably, the charging system may only comprise one type of charging system, or the charging system may comprise an online charging system and an offline charging system, wherein the offline charging system may comprise a CCF, a CDF/CGF. For details, please refer to the standard 3GPP TS 32.240.

For example, the first sub-sending module may send charging information and the time window to the CCF through a Rf Account Request.

For another example, the first sub-sending module may send the charging information and the time window to the OCS through a Ro Credit Control Request.

In this embodiment, the RF interface is also likely called a Gz interface, and the Ro interface is also likely called a Gy interface. For the Gz interface and Gy interface, please see the standard TS32.251.

In this approach, the charging system, after receiving the aggregated charging information, will aggregate the charging information and generate CDR(s), which will be detailed in the following embodiment with reference to FIG. 3.

2) The sending module 13 comprises a second sub-sending module (not shown). The charging aggregation result comprises the generated charging data record(s), and the second sub-sending module sends the charging data record(s) to a bill generation system in the MTC-enabled system. Preferably, in this approach, the charging information used to be aggregated to generate the charging data record is called an offline charging type.

For example, the second sub-sending module sends the CDR(s) to the billing system via an FTP/GTP interface; for another example, the network element sends the CDR(s) to the CGF, etc.

In this approach, the bill generation system may generate bill(s) based on the received charging data record(s).

It should be noted that the above example is only for better illustrating the technical solution of the present invention, not for limiting the present invention. Those skilled in the art should understand that any implementation manner of sending the charging aggregation result to corresponding device(s) in the system should be included within the scope of the present invention.

Since mass repetitive information exists between the charging information of user equipments belonging to the same group, even the data volume of valid user information in the charging information may be less than the additional information generated by the MTC application, for example, the header information or packaging information generated for transmitting a message, the present embodiment can aggregate the charging information of a plurality of user equipments belonging to the same group, thereby greatly reducing the communication traffic and alleviating the system burden.

As one of the preferred solutions of the present embodiment, the first aggregating module 12 comprises a third sub-aggregating module (not shown), and the sending module 13 comprises a third sub-sending module (not shown). In the present preferred solution, the charging system has a plurality of types, for example, the charging system comprises two types: online charging system and offline charging system.

The third sub-aggregating module aggregates the different types of charging information collected by the collecting module 11 to obtain the charging aggregation results corresponding to different charging types, respectively, i.e., obtaining the aggregated charging information or charging data records corresponding to different charging types, respectively.

In this embodiment, the third sub-aggregating module may determine the charging type of the charging information based on the local database or through accessing HSS.

Preferably, the third sub-aggregating module aggregates each type of charging information of the user equipments belonging to the same group into one piece of aggregated charging information or one charging data record, respectively; for example, the third sub-aggregating module aggregates the online charging type of charging information into one piece of aggregated charging information or one charging data record corresponding to the online charging type, and aggregates the offline charging type of charging information into one piece of aggregated charging information or one charging data record.

More preferably, when a group further comprises a plurality of sub-groups, the third sub-aggregating module determines the sub-groups, to which respective user equipments belong, based on a predetermined policy and the identifiers of respective user equipments, and aggregates the charging information, which type is the same and corresponding to the user equipments belonging to the same sub-group, into one charging aggregation result. For example, the charging type comprises an online charging type and an offline charging type; group A further comprises a sub-group A1 and a sub-group A2; then the third sub-aggregating module aggregates charging information, which type is the online charging type and corresponding to the user equipments belonging to sub-group A1, into one charging aggregation result, aggregates the charging information, which type is the online charging type and corresponding to the user equipments belonging to sub-group A2, into one charging aggregation result, aggregates the charging information, which type is the offline charging type and corresponding to the user equipments belonging to sub-group A1, into one charging aggregation result, and aggregates the offline charging type of charging information of the user equipments belonging to sub-group A2 into one charging aggregation result.

It should be noted that the above example is only for better illustrating the technical solution of the present invention, not intended to limit the present invention. Those skilled in the art should understand that any implementation manner of aggregating different types of charging information so as to obtain charging aggregation results corresponding to different charging types respectively, i.e., obtaining aggregated charging information or charging data records corresponding to different charging types, respectively, should be included within the scope of the present invention.

Next, the third sub-sending module sends the charging aggregation results to the corresponding device(s) in the system based on the charging types to which the charging aggregation results correspond, respectively.

For example, the third sub-sending module sends, within the corresponding time window, the charging data record with the online charging type to the OCS, etc.

It should be noted that for different charging types, the time lengths of the time windows as determined by the network element may vary. For example, if the type of the charging information which needs to be collected is an online charging type, the length of the time window for collecting such charging information is usually relatively short, for example, a few seconds, etc., so as to guarantee the real-time nature of the online charging.

Figure 5:
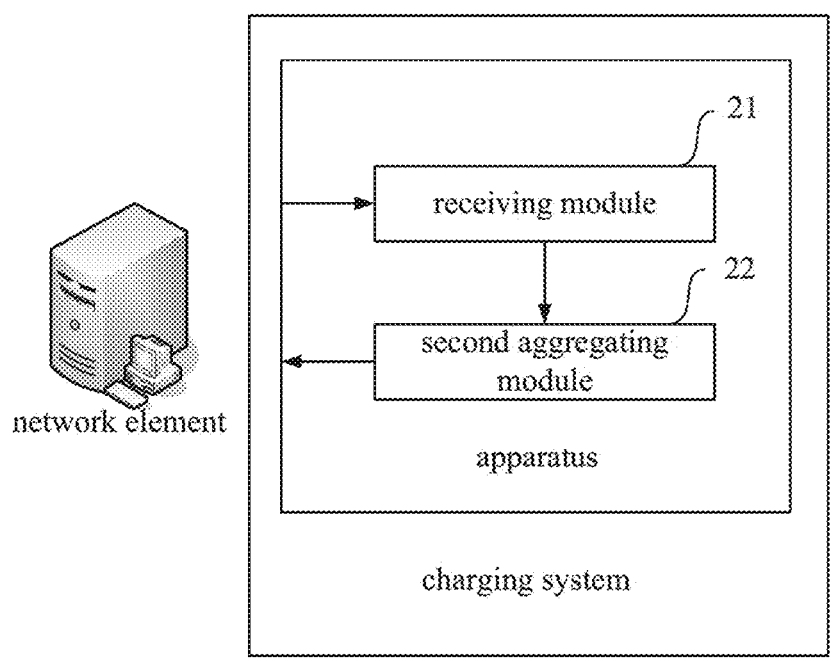
FIG. 5 shows a structural diagram of an apparatus for generating charging data record(s) in a charging system of an MTC-enabled system according to one preferred embodiment of the present invention.

FIG. 5 shows a structural diagram of an apparatus for generating charging data record(s) in a charging system of an MTC-enabled system according to one preferred embodiment of the present invention. The apparatus of this embodiment comprises a receiving module 21 and a second aggregating module 22.

The receiving module 21 receive a plurality of pieces of aggregated charging information and time windows sent by network element(s) in said system, wherein each piece of charging information respectively corresponds to one of the time windows.

The collecting module 11, the first aggregating module 12 and the sending module 13 in the embodiment with reference to FIG. 4 may execute repetitively, so that the network element sends charging information aggregated using the charging information collected in different time windows.

The second aggregating module 22 aggregates the plurality of pieces of aggregated charging information based on the time windows and the group(s) and/or sub-group(s) to which the user equipments belong, to generate charging data record(s), wherein the time windows and the user equipments correspond to the plurality of pieces of aggregated charging information.

In this embodiment, the second aggregating module 22 may directly obtain an identifier of a group and/or sub-group, to which the user equipment corresponding to the charging information belongs, from the charging information or from a request containing charging information, for example, Rf charging request or Ro credit control request, then the second aggregating module 22 may preferably aggregates (for example, merging repetitive information, etc.) the plurality of pieces of aggregated charging information which corresponds to identical or approximate time windows and corresponds to user equipments belonging to a same group and/or sub-group, thereby generating charging data record(s).

It should be noted that the above example is only for better illustrating the technical solution of the present invention, not for limiting the present invention. Those skilled in the art should understand that any implementation manner of aggregating the plurality of pieces of aggregated charging information based on the time windows and the group(s) and/or sub-group(s) to which the user equipments belong to generate charging data record(s), wherein the time windows and the user equipments correspond to the plurality of pieces of aggregated charging information, should be included within the scope of the present invention.

As one of the preferred solutions of this embodiment, second aggregating module 22 further comprises a fourth sub-aggregating module (not shown). The fourth sub-aggregating module aggregates a plurality of pieces of aggregated charging information which corresponds to identical or approximate time windows and corresponds to user equipments belonging to a same group and/or sub-group, thereby generating a charging data record.

Preferably, the fourth sub-aggregating module may further correlate a plurality of charging data records corresponding to different sub-groups under the same group, for example, sharing the same group ID.

Preferably, there may exist a plurality of charging systems with the same charging type, for example, there exists a plurality of CCF or CDF, to handle the local traffic and for overload controlling or failover. For the sending of the aggregated charging information and the time window, the network element should determine one or more charging system, that the aggregated charging information and the time window should be sent to, of the plurality of charging systems.

After obtaining the aggregated charging data record(s), the charging system may perform batch processing to the user equipments belonging to the same group or sub-group based on the charging related information of the user equipments included in the charging data records, which greatly accelerates the charging processing speed while alleviating the system load.

It should be noted that for online charging, when the online charging system determines that some user equipments in one group or one sub-group have insufficient credits or have no qualifications, the online charging system will lock this part of user equipments, but the online charging system might allow other eligible user equipments to continue communication and send to the network element(s) licenses to those eligible user equipments. In this case, the network element only sends messages to the allowed user equipments. Moreover, in the scenario in which the network element obtains the aggregated charging information and sends it to the charging system in step S12; after receiving the licenses granted by the online charging system, the network element may also generate a charging data record based on the collected charging information, while this charging data record needs not to be provided to the charging system.

It should be noted that the present invention may be implemented in software and/or a combination of software and hardware. For example, the apparatus according to the present invention may be implemented using an application-specific integrated circuit (ASIC) or any other similar hardware equipment. In one embodiment, the software program of the present invention may be executed through a processor to implement the above steps or functions. Likewise, the software program (including relevant data structure) of the present invention may be stored in a readable recording medium. Further, some steps or functions of the present invention may be implemented by hardware, for example as a circuit cooperating with a processor to execute various steps or functions.

To those skilled in the art, it is apparent that the present invention is not limited to the details of the above exemplary embodiments, and without departing from the spirit or essential features of the present invention, the present invention may be implemented by other specific forms. Thus, regardless of from which aspect, the embodiments should be regarded as illustrative, not limitative, and the scope of the present is defined by the appended claims instead of the above depictions; therefore, all variations intended to fall within the meaning and scope of equivalent elements of the claims should be included within the present invention. Any reference numerals in the claims should not be regarded as limiting the involved claims. Besides, it is apparent that the terms "comprise" and "include" do not exclude other elements or steps, a singular form does not exclude the plural form. Multiple units or modules as stated in the system claims may also be implemented by one unit or module through software or hardware. The terms "first" and "second" and the like are used to indicate names, instead of any specific sequence.

What is claimed is:

1. An apparatus configured to aggregate charging information in a network element of a machine type communication (MTC)-enabled system, the apparatus comprises:
    a memory having computer readable instructions stored thereon; and
    a processor configured to execute the computer readable instructions to,
        determine sub-groups to which a plurality of user equipments (UEs) belong based on a rule and identifiers of the plurality of UEs,
        collect, within a time window, the charging information of the plurality of UEs in a same sub-group,
        aggregate the charging information of the plurality of UEs based on the sub-groups to obtain a charging aggregation result, and
        send the charging aggregation result to at least one of the plurality of UEs in the MTC enabled system.

2. The apparatus according to claim 1, wherein
    the processor is further configured to execute the computer readable instructions to send the aggregated charging information and the time window to a charging system in the MTC enabled system.

3. The apparatus according to claim 1, wherein
    the charging aggregation result includes one or more charging data records obtained through aggregating the charging information, and
    the processor is further configured to execute the computer readable instructions to send the one or more charging data records to a bill generation system in the MTC enabled system.

4. The apparatus according to claim 1, wherein the processor is configured to execute the computer readable instructions to aggregate the charging information of the plurality of UEs in the same sub-group into the charging aggregation result.

5. The apparatus according to claim 1, wherein
    the sub-group includes a plurality of sub-groups, and
    the charging aggregation result includes an identifier of the same sub-group.

6. The apparatus according to claim 1, wherein the processor is further configured to execute the compute readable instructions to,
    collect, within the time window, the charging information including a same group identification code, and
    obtain the charging information of the plurality of UEs within the same group identification code.

7. The apparatus according to claim 1, wherein the processor is further configured to execute the compute readable instructions to,
    aggregate the charging information of different charging types to obtain the charging aggregation results, and
    send the charging aggregation results to a respective one of the plurality of UEs in the MTC enabled system based on the different charging types to which the charging aggregation results correspond.

8. The apparatus according to claim 1, wherein the network element includes one of a mobile switching center, a mobile management entity, a serving general packet radio service (GPRS) support node, and an application server.

9. A system comprising the apparatus according to claim 8.

10. A system comprising the apparatus according to claim 1.

11. The apparatus according to claim 1, wherein the rule is provided by a Policy Control and Charging Rules Function (PCRF).

12. An apparatus configured to generate charging data records in a charging system of a machine type communication (MTC)-enabled system, the apparatus comprises:
    a memory having computer readable instructions stored thereon; and
    a processor configured to execute the computer readable instructions to,
        receive a plurality of pieces of aggregated charging information and a plurality of time windows sent by a plurality of user equipments (UEs) in the MTC enabled system, each of the plurality of pieces of the charging information corresponds to one of the plurality of time windows,
        aggregate the plurality of pieces of the charging information corresponding to (i) a same one of the plurality of time windows and (ii) the plurality of UEs belonging to the same groups and/or sub-groups to generate charging data records,
    wherein the plurality of time windows and the plurality of UEs correspond to the plurality of pieces of the charging information.

13. A method for aggregating charging information in a network element of a machine type communication (MTC)-enabled system, the method comprising:
    determining sub-groups to which a plurality of user equipments (UEs) belong based on a rule and identifiers of the plurality of UEs;
    collecting, within a time window, the charging information of the plurality of UEs in a same sub-group;
    aggregating the charging information of the plurality of UEs based on the sub-groups to obtain a charging aggregation result; and
    sending the charging aggregation result to at least one of the plurality of UEs in the MTC enabled system.

14. The method according to claim 13, wherein
    the sending sends the aggregated charging information and the time window to a charging system in the MTC enabled system.

15. The method according to claim 13, wherein
    the charging aggregation result includes one or more charging data records obtained through aggregating the charging information, and
    the sending sends the one or more charging data records to a bill generating system in the MTC enabled system.

16. The method according to claim 13, wherein the rule is provided by a Policy Control and Charging Rules Function (PCRF).

17. A method for generating charging data records in a charging system of a machine type communication (MTC)-enabled system, the method comprising:
    receiving a plurality of pieces of aggregated charging information and a plurality of time windows sent by a plurality of user equipments (UEs) in the MTC enabled system, each of the plurality of pieces of the charging information corresponds to one of the plurality of time windows; and
    aggregating the plurality of pieces of the charging information corresponding to (i) a same one of the plurality of time windows, and (ii) the plurality of UEs belonging to the same groups and sub-groups to generate charging data records,
wherein the plurality of time windows and the plurality of UEs correspond to the plurality of pieces of the charging information.

* * * * *